United States Patent
Schanz et al.

(10) Patent No.: US 6,181,725 B1
(45) Date of Patent: Jan. 30, 2001

(54) GAS LASER HAVING A BEAM PATH FOLDED IN SEVERAL PLANES

(75) Inventors: Klaus Schanz; Berthold Leifermann, both of Reinbek; Jörg Porath, Hamburg, all of (DE)

(73) Assignee: Rofin-Sinar Laser GmbH, Hamburg (DE)

( * ) Notice: Under 35 U.S.C. 154(b), the term of this patent shall be extended for 0 days.

(21) Appl. No.: 09/131,807

(22) Filed: Aug. 10, 1998

(30) Foreign Application Priority Data

Aug. 8, 1997 (DE) .............................................. 197 34 308

(51) Int. Cl.$^7$ .............................. H01S 3/03; H01S 3/081; H01S 3/08
(52) U.S. Cl. ................. 372/61; 372/93; 372/92; 372/98; 372/99; 372/108
(58) Field of Search ................................ 372/61, 93, 107, 372/98, 99, 108, 109, 64, 68, 92

(56) References Cited

U.S. PATENT DOCUMENTS

| | | | |
|---|---|---|---|
| 5,412,685 | * | 5/1995 | Egawa et al. ........................... 372/93 |
| 5,596,594 | * | 1/1997 | Egawa ..................................... 372/93 |
| 5,696,787 | * | 12/1997 | Egawa et al. ........................... 372/93 |

FOREIGN PATENT DOCUMENTS

| | | | |
|---|---|---|---|
| 3722256 | * | 6/1987 | (DE) . |
| 05315678 | * | 11/1993 | (EP) . |
| 0580867 | * | 2/1994 | (EP) . |
| 0 580 867 A1 | | 2/1994 | (EP) . |
| 0591541 | * | 4/1994 | (EP) . |
| 0 623 979 A1 | | 11/1994 | (EP) . |
| 0 695 599 A1 | | 2/1996 | (EP) . |
| 0695599 | * | 7/1996 | (EP) . |

OTHER PUBLICATIONS

Japanese Patent Abstract No. 61187386 (Akihiro), dated Aug. 21, 1986.
Japanese Patent Abstract No. 05315678 (Yuji), dated Nov. 26,1993.

* cited by examiner

*Primary Examiner*—Frank G. Font
*Assistant Examiner*—Armando Rodriguez
(74) *Attorney, Agent, or Firm*—Herbert L. Lerner; Laurence A. Greenberg; Werner H. Stemer

(57) ABSTRACT

A gas laser, in particular an axial-flow $CO_2$ gas laser, includes a resonator having a folded beam path in a first folding plane and in a second folding plane inclined at 45° thereto. At least one Z-fold of the beam path is provided in the first folding plane and at least one U-fold of the beam path is provided in the second folding plane.

25 Claims, 4 Drawing Sheets

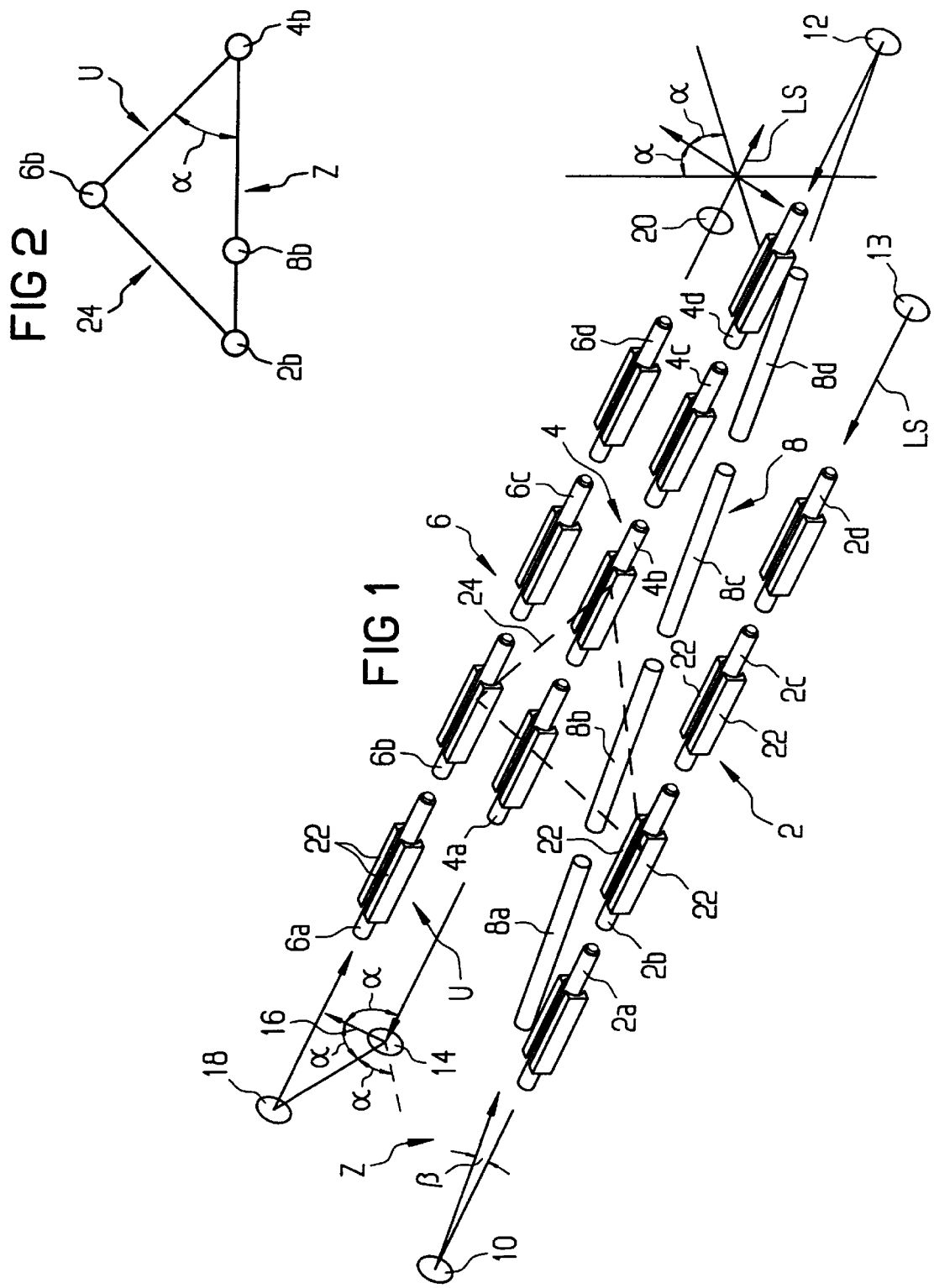

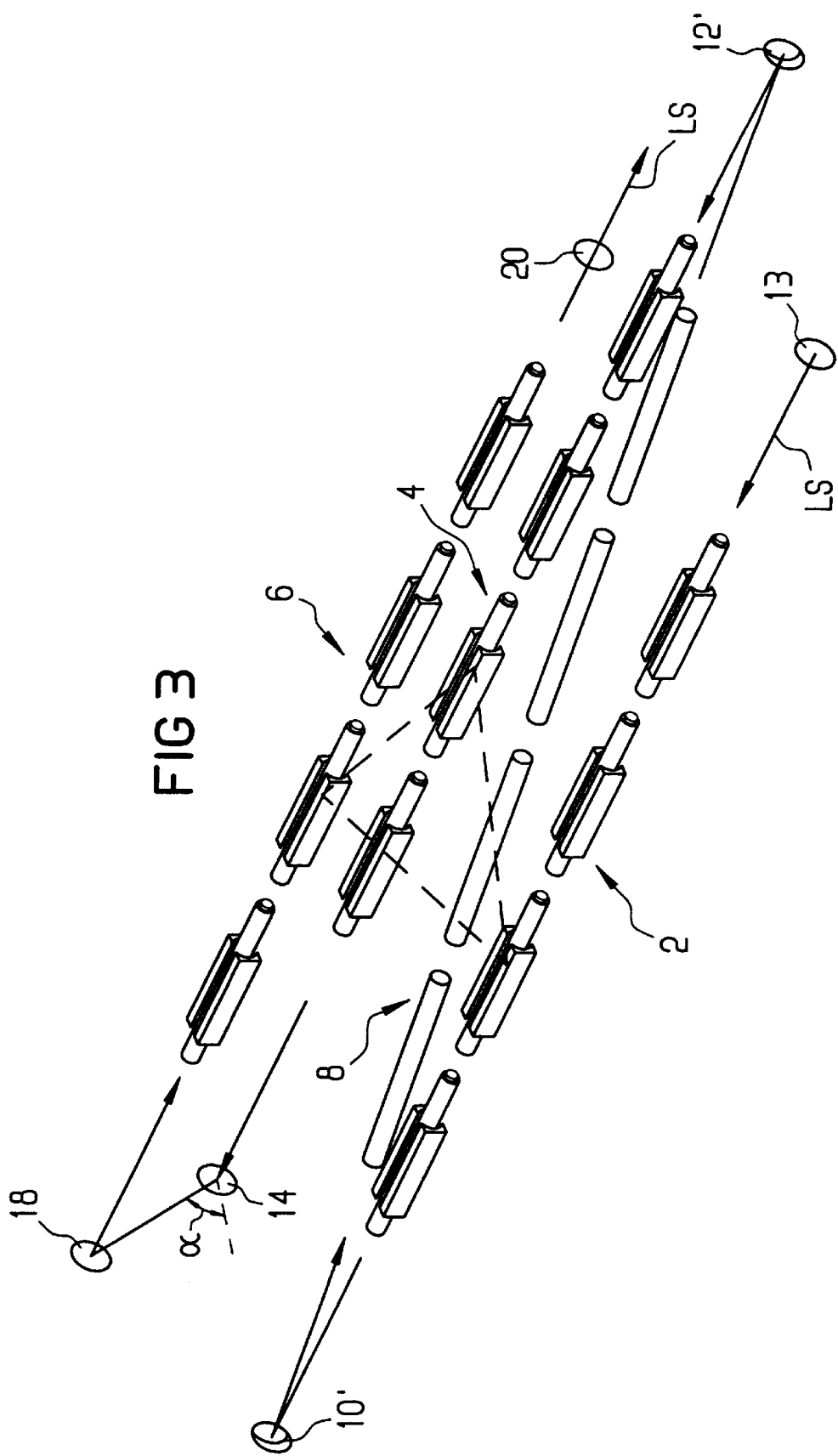

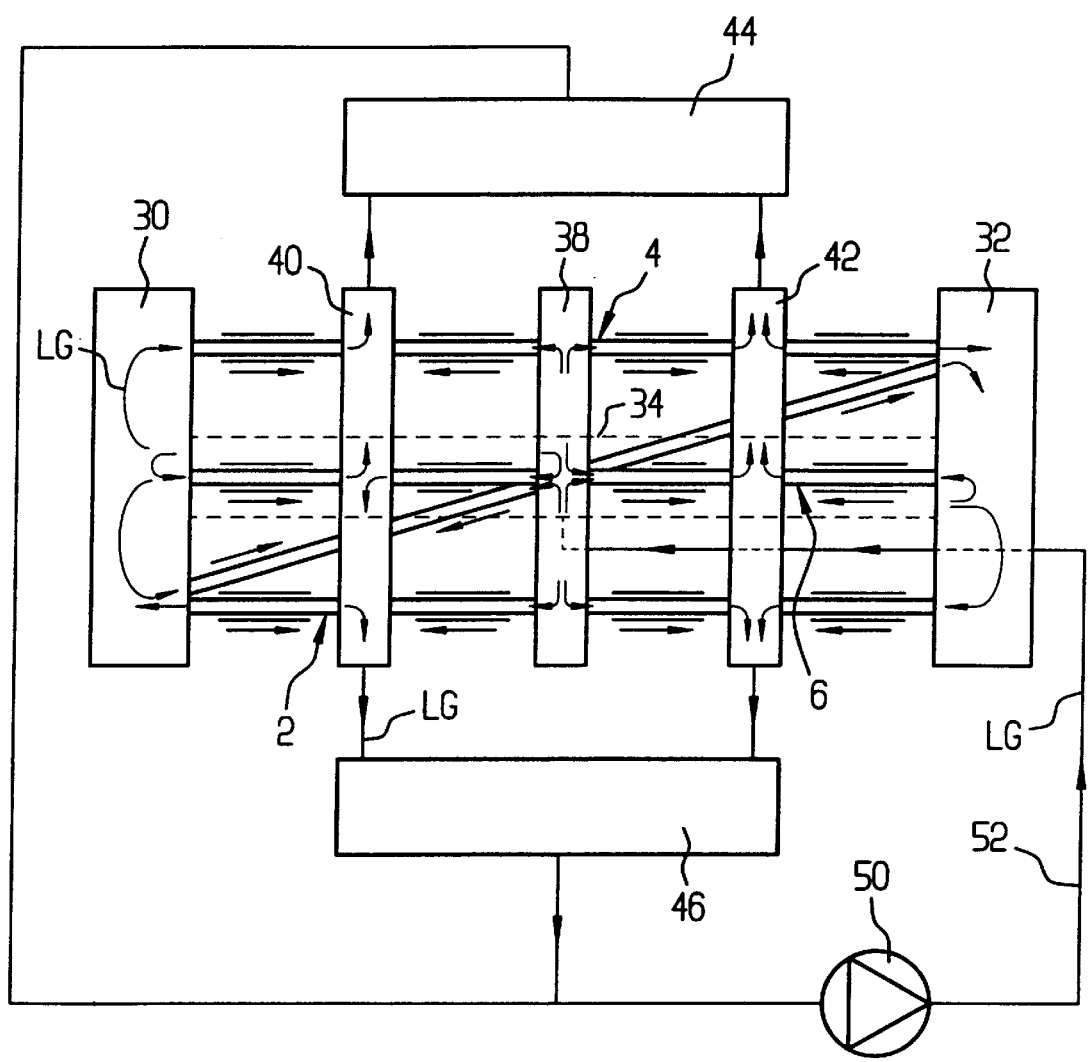

GAS LASER HAVING A BEAM PATH FOLDED IN SEVERAL PLANES

BACKGROUND OF THE INVENTION

Field of the Invention

The invention relates to a gas laser, in particular an axial-flow $CO_2$ gas laser, having a resonator with a beam path folded in several planes.

It is known from Published UK Patent Application 2 090 047 A that it is expedient to use a circularly polarized laser beam for material processing employing a laser beam, in particular for cutting a workpiece, since in that case the cutting quality when cutting by using a laser is independent of the cutting direction. In the case of the laser known from that Published UK Patent Application, such a circular polarization is generated by using a phase-shifting mirror inclined at 45° to the direction of propagation to convert a linearly polarized laser beam emerging from the resonator of the laser into a circularly polarized laser beam. For that purpose, the direction of polarization of the linearly polarized laser beam must be at an angle of 45° to the plane of incidence defined by the normal of the phase-shifting mirror and the direction of incidence on the phase-shifting mirror. The known $CO_2$ gas laser has a folded beam path which has a Z-fold in a folding plane. A folding mirror of the Z-fold is disposed with its normal at 45° to the plane defined by the Z-fold, with the result that the laser beam incident on it from a Z-limb defines in common with the normal a plane which is orientated at 45° to the plane of the Z-fold. In that way, the beam emerging from the resonator is already polarized at 45° to the plane of the Z-fold. The laser beam emerging from the resonator is converted through the use of the phase-shifting mirror into a circularly polarized beam which is then directed onto a workpiece through further deflecting mirrors external to the resonator.

It is known from European Patent 0 121 661 B1, corresponding to U.S. Pat. No. 4,634,831, to place a flat resonator with a beam path folded in a multiple U-shaped manner at 45° to the horizontal. Therefore, upon leaving the resonator, the direction of polarization of the laser beam emerging from the resonator and linearly polarized, as a consequence of the U-fold, perpendicular to the plane defined by the U-fold, is already at 45° to the horizontal. That laser beam which is linearly polarized at 45° can then both be deflected by 90° towards a generally horizontally disposed processing surface of a workpiece, and also converted into a circularly polarized laser beam, through the use of a phase-shifting mirror. Therefore, such a configuration eliminates the polarization mirror which is required at the end of a limb on the Z-fold in the resonator according to Published UK Patent Application 2 090 047 A.

Published European Patent Application 0 591 541 A1 has disclosed a $CO_2$ gas laser with a resonator having a beam path folded in two mutually perpendicular U-planes. The two U-planes are disposed at 45° to the horizontal and folded with one another. The two U-folds are connected to one another through a coupling mirror, the normal of which is vertically orientated. In that way, a laser beam is produced which is linearly polarized at 45° to the vertical. German Published, Non-Prosecuted Patent Application DE 37 22 256 A1 has disclosed a laser resonator which has two U-folds that are disposed parallel to one another in mutually separated planes and are connected to one another through a coupling section extending diagonally at 45° to the U-folding planes. The diagonal coupling section connects limbs of the two U-folds which are opposite one another diagonally. It effects a rotation of the beam by 90°, with the result that the s and p-components of the upper U-folding plane are transformed into respective p and s-components of the lower U-folding plane. That results in mutual compensation of the polarization effects of the 90° reflecting mirrors disposed in the U-folding planes, thereby leaving a 45° polarization produced by the diagonal reflection. In addition to the linear polarization of the output beam at 45° to the horizontal, other requirements which must be fulfilled by a $CO_2$ gas laser that is to be used, in particular for cutting applications, are a rotationally symmetrical radiance distribution as well as a high beam quality. A high beam quality requires a low Fresnel number $N_F=a^2/(\lambda \cdot L)$, wherein a is the aperture, $\lambda$ is the wavelength and L is the resonator length. In practice, the resonator length used for high-power $CO_2$ gas lasers is about 5–10 m. The construction of a compact high-power $CO_2$ gas laser is thus possible only with a resonator which has a multiply folded beam path. However, a multiply folded beam path such as is known from the printed publications mentioned at the outset, has the disadvantage of requiring a multiplicity of deflecting or folding mirrors in the resonator, which make the laser more expensive and lead to a reduction in efficiency due to absorption that takes place in them. A multiplicity of deflecting or folding mirrors also complicates the adjustment of the resonator. Moreover, there is a need for a complicated mechanical structure which absorbs the thermal stresses produced by heating during operation, without that entailing maladjustment of the sensitive optical components in the resonator.

SUMMARY OF THE INVENTION

It is accordingly an object of the invention to provide a gas laser having a beam path folded in several planes, which overcomes the hereinafore-mentioned disadvantages of the heretofore-known devices of this general type, which permits a large resonator length in conjunction with a compact structure and which generates at its output a laser beam linearly polarized at 45° to the horizontal through the use of as small a number of folding mirrors as possible.

With the foregoing and other objects in view there is provided, in accordance with the invention, a gas laser, in particular an axial-flow $CO_2$ gas laser, comprising a resonator having a folded beam path in a first folding plane and in a second folding plane; the second folding plane inclined at 45° relative to the first folding plane; the first folding plane having at least one Z-fold of the beam path; and the second folding plane having at least one U-fold of the beam path. A laser beam linearly polarized at 45° to the first folding plane is generated in this way.

In accordance with another feature of the invention, the first folding plane is positioned in the horizontal in such a way that the laser beam emerging from the resonator is linearly polarized at 45° to the horizontal. The plane of the U-fold uniquely fixes the plane of polarization or direction of polarization, since the folding mirrors orientated at 45° to the direction of incidence of the laser beam for the purpose of deflection in the U-fold and for a laser beam (s-wave) linearly polarized perpendicular to the plane of incidence (which is the plane of the U-fold) have a higher reflectivity than for a laser beam having a direction of polarization with a component parallel to the plane of incidence (p-wave). In other words: the s-components of the electromagnetic waves propagating in the resonator are selected by the relatively low absorption, and the p-components are suppressed.

In contrast, the folding mirrors of the Z-fold do not contribute to the polarization of the laser beam generated in the resonator, since the laser beam impinges on the deflecting mirrors of the Z-fold at an acute angle at which the different absorption of the s and p-waves does not occur to the same extent as for the deflecting mirrors of the U-fold, which are orientated at 45° to the laser beam.

In accordance with a further feature of the invention, there is provided at least a first gas discharge section and a second gas discharge section parallel thereto and intercoupled diagonally in the first folding plane, and a third gas discharge section coupled and parallel to the second gas discharge section in a U-shaped manner forming the second folding plane. A compact construction is rendered possible by this measure in conjunction with a high resonator length.

In accordance with an added feature of the invention, the gas discharge sections intersect a plane of section or cutting section extending perpendicular to them at points which define an isosceles, and thus also right-angled triangle. Due to the symmetry provided thereby, this renders possible a compact and stable construction.

In accordance with an additional feature of the invention, the first and the second gas discharge section are intercoupled diagonally by a passive coupling section, with laser gas flowing through the coupling section. A very acute-angled Z-fold can be realized in this way, since the diagonally guided gas discharge section need not be provided with electrodes which have to be shielded with respect to the neighboring electrodes of the Z-limbs.

In accordance with yet another feature of the invention, each gas discharge section includes at least two active subsections through which flow occurs axially in mutually opposite directions. As a result, it is possible to achieve high power densities even in the case of long gas discharge sections, since the laser gas need not flow through the entire gas discharge section, one thing which would lead to excessive heating of the laser gas and to a reduction in the efficiency.

In accordance with yet a further feature of the invention, respectively neighboring subsections in which the gas flows are directed toward one another, open into a common gas extraction block.

In accordance with yet an added feature of the invention, respectively neighboring subsections in which the gas flows are directed away from one another, open into a common gas feed block. This ensures a compact gas guidance.

In accordance with yet an additional feature of the invention, each gas discharge section includes the same number of subsections, and subsections neighboring one another transverse to the longitudinal direction are respectively assigned a common gas feed and gas extraction block.

In accordance with again another feature of the invention, each gas discharge section includes four subsections, and subsections respectively neighboring one another conduct a flow in mutually opposite directions. It is possible in this way to realize a relatively long gas discharge section in which impermissible heating of the laser gas can be avoided with an acceptable technical outlay.

In accordance with again a further feature of the invention, the subsections are mounted in an axially floating manner in the gas extraction and/or in the gas feed block. Due to such a floating bearing, the thermal expansions of the discharge or coupling tubes forming the subsections are absorbed in a manner largely free from forces.

In accordance with again an added feature of the invention, the active and passive subsections neighboring one another at the end of the gas discharge sections or the coupling sections are respectively mounted in an axially floating manner in a common end flange.

In accordance with again an additional feature of the invention, there are provided resonator mirrors, that is to say folding mirrors, a retroreflecting mirror and an output mirror of the resonator, which are disposed in the end flanges. This permits a compact construction and effective cooling of the resonator mirrors.

In accordance with still another feature of the invention, the end flanges are provided simultaneously for feeding fresh gas, that is to say cooled laser gas. Heating of the resonator mirrors is additionally reduced in this way.

In accordance with still a further feature of the invention, the end flanges are rigidly interconnected through the use of spacer tubes.

In accordance with still an added feature of the invention, there is provided a central support tube mounted in an axially floating manner in the end flanges, the central support tube at the same time guiding cooled laser gas.

In accordance with still an additional feature of the invention, there are provided two heat exchangers, each gas extraction block connected on the suction side to each heat exchanger. This permits gas to be guided by using short gas paths and correspondingly low flow resistances.

In accordance with a concomitant feature of the invention, at least the folding mirrors of the Z-fold have spherically or aspherically curved surfaces, in particular the mirror surfaces are paraboloids of revolution which, for the purpose of forming a Z-fold, are disposed with their rotation axis or optical axis at an angle relative to the direction of propagation of the laser beam (off axis) and form a telescope internal to the resonator. As a result, the Fresnel number can be reduced for a given overall length, or loading of the output window can be reduced for the same Fresnel number by expanding the laser beam.

Other features which are considered as characteristic for the invention are set forth in the appended claims.

Although the invention is illustrated and described herein as embodied in a gas laser having a beam path folded in several planes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view of a resonator structure of a gas laser in accordance with the invention;

FIG. 2 is a sectional view of the resonator structure perpendicular to the longitudinal direction;

FIG. 3 is a perspective view of an advantageous embodiment of the resonator structure with curved folding mirrors;

FIG. 5 is a block diagram showing guidance of gas in the gas laser according to the invention.

DESCRIPTION OF THE PREFERRED EMBODIMENTS

Figure 4:
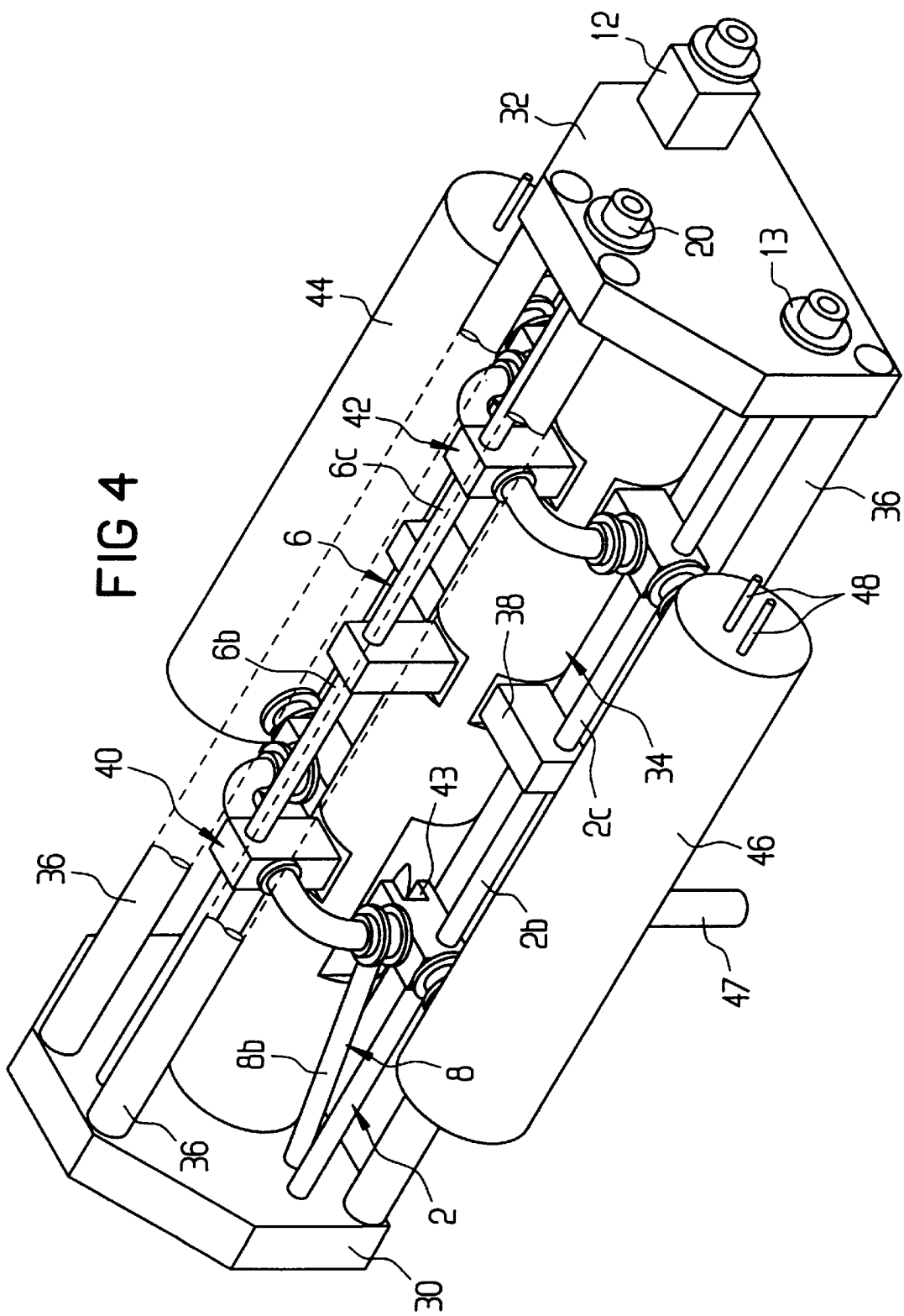
FIG. 4 is a perspective view showing a mechanical structure of the gas laser according to the invention.

Referring now to the figures of the drawings in detail and first, particularly, to FIG. 1 thereof, there is seen a gas laser, in particular an axial-flow $CO_2$ gas laser, which includes respective first, second and third gas discharge sections 2, 4 and 6. The gas discharge sections 2, 4, 6 are disposed parallel to one another, and in each case have a length of from 1 m to 2.5 m. The first gas discharge section 2 is optically coupled to the second gas discharge section 4 through a diagonal coupling section 8 and folding mirrors 10 and 12. A totally-reflecting retroreflecting mirror 13 is disposed at an end of the first gas discharge section 2 facing away from the folding mirror 10. A laser beam LS propagates in the longitudinal direction of the gas discharge sections 2, 4, 6 and of the coupling section 8.

The first gas discharge section 2, the second gas discharge section 4 and the coupling section 8 define a first folding plane Z, in which a Z-fold of the beam path of the laser beam LS is present.

A folding mirror 14 is disposed at an end of the second gas discharge section 4 opposite the folding mirror 12, in such a way that a plane (plane of incidence) defined by its normal 16 and the longitudinal direction of the gas discharge section 4 is orientated at an angle $\alpha=45°$ to the first folding plane Z. This plane of incidence fixes a second folding plane U of the folded beam path. The beam emerging from the gas discharge section 4 toward the folding mirror 14 is deflected in this second folding plane by 90°, and is propagated at 45° to the first folding plane Z. A folding mirror 18, which is associated with the folding mirror 14, deflects the laser beam LS that is incident on it by 90° in the second folding plane U. The folding mirrors 14 and 18 thus form a U-fold in the second folding plane U. The folding mirror 18 is coupled to the third gas discharge section 6. An output mirror 20, from which the laser beam LS emerges, is disposed at an end of the third gas discharge section 6 facing away from the folding mirror 18.

An angle β of the Z-fold is acute and amounts, for example, to approximately 10–20°, with the result that the angle of incidence of the laser beams LS incident on the folding mirrors 10, 12 of the Z-fold from the discharge sections 2, 4 or the coupling section 8, is between 5 and 10°. It is ensured in this way that the folding mirrors 10, 12 of the Z-fold have no influence on the direction of polarization of the laser beam LS emerging from the output mirror 20. This direction of polarization is fixed only by the folding mirrors 14, 18 of the U-fold, and is perpendicular to the second folding plane U. In the case of a horizontally disposed first folding plane Z, the laser beam LS emerging from the output mirror 20 is therefore linearly polarized at an angle of $\alpha=45°$ to the horizontal or vertical.

Each gas discharge section 2, 4, 6 is divided into subsections 2a–2d, 4a–4d and 6a–6d, respectively. These subsections 2a–2d, 4a–4d, 6a–6d are formed by tube sections. A respective electrode pair 22 is assigned to each of the tube sections for RF excitation of laser gas flowing axially in the tube sections. The subsections 2a–2d, 4a–4d, 6a–6d fix a space in which a gas discharge takes place, and thus form a laser-active volume.

It is seen in the exemplary embodiment that the diagonal coupling section 8 is also divided into four subsections 8a–8d.

The gas discharge sections 2, 4 and 6 are disposed in a plane perpendicular to their longitudinal direction at corner points of a triangle 24.

It is seen in FIG. 2 that this triangle 24 is isosceles and right-angled, with the result that the gas discharge section 6 is equally spaced from the gas discharge sections 2 and 4. The first folding plane Z and the second folding plane U are disposed perpendicular to the plane of the drawing and are inclined relative to one another at the angle $\alpha=45°$.

In accordance with FIG. 3, an embodiment is provided in which the coupling section 8 is assigned folding mirrors 10' and 12' having surfaces that are curved. In the exemplary embodiment, the folding mirror 10' has a concavely curved surface, and the folding mirror 12' a convexly curved surface. The two folding mirrors 10' and 12' form a telescope internal to the resonator, that is to say their focal points coincide, with the result that they convert a parallel beam into a parallel beam. The Fresnel number can be further reduced for a given overall length with the aid of this telescope internal to the resonator. In a preferred embodiment, the folding mirrors 10' and 12' are spherically curved. In a further advantageous embodiment, it is also possible to provide aspherical folding mirrors which are formed from paraboloids of revolution disposed off axis, in order to avoid spherical imaging errors.

In accordance with FIG. 4, the gas discharge sections 2, 4, 6 and the coupling section 8 are disposed between two end flanges 30 and 32, although the gas discharge section 4 is not visible in the figure. The end flanges 30 and 32 support the resonator mirrors of the resonator. Mounts for the retroreflecting mirror 13, for the folding mirror 12 of the Z-fold and for the output mirror 20, are visible in the figure. A central support tube 34 is mounted in an axially floating manner in the two end flanges 30, 32. A spacer tube 36 surrounding the central support tube 34 and made from a material having a low coefficient of thermal expansion, rigidly interconnects the end flanges 30, 32.

A T-shaped gas feed block 38 is disposed centrally in the support tube 34. Ends of the centrally disposed subsections 2b, 2c, 4b, 4c, 6b, 6c and 8b, 8c which face each other open into the gas feed block 38. The gas feed block 38 is provided with non-illustrated internal ducts through which laser gas guided in the support tube is fed into the subsections 2b, 2c, 4b, 4c, 6b, 6c, 8b, 8c. Likewise T-shaped gas extraction blocks 40 and 42 are each disposed between a respective one of the end flanges 30, 32 and the gas feed block 38. Ends of the subsections 2a, 2b, 4a, 4b, 6a, 6b and 2c, 2d, 4c, 4d, 6c, 6d which face each other open into the respective gas extraction blocks 40 and 42. It is moreover seen in the figure that each of the gas extraction blocks 40, 42 have a cutout 43, although the cutout in the gas extraction block 42 is not visible in the figure. The respective subsections 8b and 8c of the coupling section 8 are guided through the cutouts 43, with the result that in this case the coupling section 8 has only two subsections 8b and 8c.

The gas extraction blocks 40 and 42 are connected on one side of the support tube 34 to a heat exchanger 44, and on the opposite side of the support tube 34 to a heat exchanger 46. Each of the heat exchangers 44, 46 is connected on the suction side through a central extraction line 47 to a compressor or to a blower. The heat exchangers 44 and 46 are so-called thin-tube heat exchangers which are provided with connections 48 for feeding and removing cooling water.

The tube lengths of the subsections 2a–d, 4a–d, 6a–d and 8b, c are mounted in an axially floating manner, for example through the use of O-ring seals, in the end flanges 30, 32, in the gas feed block 38 and in the gas extraction blocks 40, 42. As a result, no forces can be transmitted between the resonator structure and the support tube 34.

It is seen in the block diagram according to FIG. 5 that a compressor or a blower 50 leads cooled laser gas LG (fresh gas) to the central support tube 34, from where it flows into the end flanges 30 and 32 as well as into the centrally disposed gas feed block 38. Those elements feed the cooled laser gas LG into the respectively assigned subsections of the gas discharge sections 2, 4, 6 and of the coupling section 8. It is seen in the figure that the gas flows through the mutually neighboring subsections of a gas discharge section 2, 4 or 6 and of the coupling section 8 in opposite directions. The end flanges 30 and 32 in the exemplary embodiment are also fed with gas through the coupling section 8.

The gas extraction blocks 40 and 42 are connected both to the heat exchanger 44 and to the heat exchanger 46, which are connected in each case on the suction side to the input of the compressor 50.

We claim:

1. A gas laser, comprising:
   a resonator having a folded beam path in a first folding plane and in a second folding plane;
   said second folding plane inclined at 45° relative to said first folding plane;
   said first folding plane having at least one Z-fold of said beam path; and
   said second folding plane having at least one U-fold of said beam path.

2. The gas laser according to claim 1, wherein said second folding plane is inclined at 45° to a horizontal plane.

3. The gas laser according to claim 1, including at least first and second mutually parallel and diagonally coupled gas discharge sections in said first folding plane, and a third gas discharge section parallel to and coupled to said second gas discharge section in a U-shape in said second folding plane.

4. The gas laser according to claim 3, wherein said gas discharge sections intersect a cutting plane extending perpendicular to said gas discharge sections at points defining an isosceles triangle.

5. The gas laser according to claim 3, including a passive coupling section through which laser gas flows, said first and second gas discharge sections coupled diagonally by said passive coupling section.

6. The gas laser according to claim 3, wherein each of said gas discharge sections has at least two active subsections conducting a flow axially in mutually opposite directions.

7. The gas laser according to claim 6, wherein said coupling section has at least two passive subsections conducting a flow axially in mutually opposite directions.

8. The gas laser according to claim 7, including common gas extraction blocks, said subsections including respective neighboring subsections directing the gas flows toward one another and opening into one of said common gas extraction blocks.

9. The gas laser according to claim 8, including common gas feed blocks, said subsections including respective neighboring subsections directing the gas flows away from one another and opening into one of said common gas feed blocks.

10. The gas laser according to claim 9, wherein each of said gas discharge sections has the same number of said subsections and a longitudinal direction, and said subsections neighboring one another in a direction transverse to said longitudinal direction are associated with a common gas extraction block and a common gas feed block.

11. The gas laser according to claim 10, wherein each of said gas discharge sections has four of said subsections including mutually neighboring subsections conducting flows in mutually opposite directions.

12. The gas laser according to claim 11, wherein said subsections are axially floatingly mounted in at least one of said blocks.

13. The gas laser according to claim 12, including common end flanges, said gas discharge sections having ends, and said active subsections neighboring one another at said ends each axially floatingly mounted in a respective one of said common end flanges.

14. The gas laser according to claim 13, wherein said coupling section has ends, and said passive subsections are each axially floatingly mounted in a respective neighboring one of said end flanges at said ends.

15. The gas laser according to claim 14, wherein said resonator has resonator mirrors disposed in said end flanges.

16. The gas laser according to claim 15, wherein said end flanges simultaneously feed cooled laser gas.

17. The gas laser according to claim 16, including spacer tubes rigidly interconnecting said end flanges.

18. The gas laser according to claim 16, including a central support tube axially floatingly mounted between said end flanges.

19. The gas laser according to claim 18, wherein said central support tube also guides cooled laser gas.

20. The gas laser according to claim 19, including two parallel-connected heat exchangers, each of said gas extraction blocks having a suction side connected to both of said heat exchangers.

21. The gas laser according to claim 1, including folding mirrors with spherically curved surfaces at least in said at least one Z-fold.

22. The gas laser according to claim 1, including folding mirrors with aspherically curved surfaces at least in said at least one Z-fold.

23. The gas laser according to claim 21, wherein said folding mirrors form a telescope inside said resonator.

24. The gas laser according to claim 22, wherein said folding mirrors form a telescope inside said resonator.

25. An axial-flow $CO_2$ gas laser, comprising:
   a resonator having a folded beam path in a first folding plane and in a second folding plane;
   said second folding plane inclined at 45° relative to said first folding plane;
   said first folding plane having at least one Z-fold of said beam path; and
   said second folding plane having at least one U-fold of said beam path.

* * * * *